Patented Dec. 11, 1934

1,984,110

UNITED STATES PATENT OFFICE 1,984,110

MANUFACTURE OF YELLOW MORDANT DYESTUFFS

Ernst Bodmer and Franz Neitzel, Basel, Switzerland, assignors to the firm Durand & Huguenin S. A., Basel, Switzerland No Drawing. Application May 12, 1932, Serial No. 610,983. In Germany May 15, 1931

11 Claims. (Cl. 260—124)

According to this invention yellow mordant dyestuffs of good fastness properties are made by condensing a 4- or 3-aminonaphthalene-1,8-dicarboxylic acid or a sulphonated derivative thereof (or the corresponding dicarboxylic acid anhydride) with an amino-hydroxybenzoic acid or a homologue or substitution product thereof. It is advantageous, in order to obtain dyestuffs of good solubility, to use as parent material a sulphonated 4- or 3-aminonaphthalene-1,8-dicarboxylic acid or an amino-hydroxybenzoic acid containing a sulphonic acid group. When in this process instead of an amino-naphthalene-1,8-dicarboxylic acid the corresponding dicarboxylic acid anhydride is used there will be obtained a quite similar result.

As a naphthalene-1,8-dicarboxylic acid, when heated in aqueous suspension, easily gives the corresponding dicarboxylic acid anhydride, it is believed that in the herein described condensation with a free amino-naphthalene-dicarboxylic acid the first step will be the transformation of this latter into the corresponding dicarboxylic acid anhydride and that therefore in this connection the free dicarboxylic acid and the corresponding dicarboxylic acid anhydride are equivalent with respect to the reaction to be performed. Some of the dyestuffs obtainable by the invention are remarkably resistant towards reducing agents such as hydro-sulphite and therefore find application in colour discharge printing processes involving reduction.

The amino-naphthalene-1,8-dicarboxylic acid compounds and the amino-hydroxybenzoic acids can be condensed in part simply by boiling the substances together in aqueous suspension. The condensation proceeds better however in the presence of a condensing agent, for example an alkali bisulphite such as sodium bisulphite.

The possibility of facilitating the condensation by means of a bisulphite permits a substantial simplification in the manufacture of the dyestuffs. The nitro-group of a nitro-naphthalene-1,8-dicarboxylic acid can be reduced to the amino-group by means of bisulphite with the simultaneous entry of a sulphonic acid group into the molecule.

It is thus possible in the manufacture of the dyestuffs in accordance with the invention to start from a 3- or 4-nitronaphthalene-1,8-dicarboxylic acid, an amino-hydroxybenzoic acid and bisulphite, the production of the sulphonated 3- or 4-amino-naphthalene-1,8-dicarboxylic acid and its condensation with the amino-hydroxybenzoic acid being combined into one operation.

The following examples illustrate the invention, the parts being by weight:—

Example 1

A mixture of

| | Parts |
|---|---|
| 5-amino-2-hydroxybenzoic acid | 153 |
| 4-amino-naphthalene-6-sulpho-1,8-dicarboxylic acid (or the corresponding quantity of its anhydride) | 311 |
| Solution of sodium bisulphite of 40° Bé | 1500 |
| Water | 500 | is heated to boiling whilst stirring. After a short time a yellow compound commences to separate; after about 2 hours the separation is complete and 5-amino-2-hydroxybenzoic acid can no longer be detected in the reaction mixture. The whole is allowed to cool and the solid is separated by filtration, washed with a solution of common salt containing hydrochloric acid in order to remove any adherent bisulphite, then dissolved in alkali and salted out from the solution.

The yellow compound formed corresponds probably to the following formula:

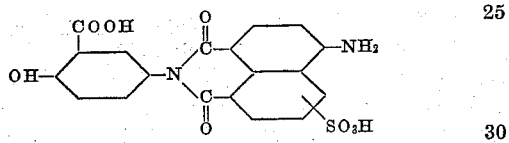

The dyestuff thus obtained dissolves in water to a yellow solution having a green fluorescence. In concentrated sulphuric acid it dissolves to a solution which is faintly yellow and becomes intensely yellow on dilution with water.

The dyestuff yields in chrome printing on cotton vivid greenish yellow shades of good fastness properties.

The dyestuff is sufficiently resistant towards hydrosulphite and can be used in reduction color discharge printing.

Example 2

By condensing 167 parts of 5-amino-4-methyl-2-hydroxybenzoic acid and 311 parts of 4-amino-naphthalene-6-sulpho-1,8-dicarboxylic acid in a manner exactly analogous to that described in Example 1 there is obtained a yellow dyestuff corresponding probably to the formula:

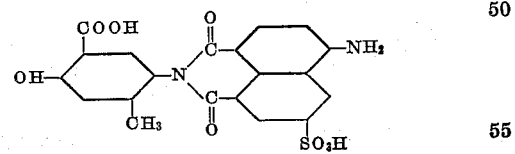

In this example 5-amino-3-methyl-2-hydroxybenzoic acid may be used instead of 5-amino-4-methyl-2-hydroxybenzoic acid and a sulphonic acid of 3-amino-naphthalene-1,8-dicarboxylic acid can be used instead of the 4-amino-naphthalene-6-sulpho-1,8-dicarboxylic acid.

So also in Example 1 there may be used instead of 5-amino-2-hydroxybenzoic acid an isomeric amino-hydroxy-benzoic acid for example 3-amino-2-hydroxybenzoic acid. In all cases there are obtained yellow mordant dyestuffs similar to that described in Example 1.

*Example 3*

A mixture of

| | Parts |
|---|---|
| 5-amino-3-sulpho-2-hydroxybenzoic acid | 233 |
| 4-amino-naphthalene-1,8-dicarboxylic acid | 231 |
| Solution of sodium bisulphite of 40° Bé | 1500 |
| Water | 500 | is heated to boiling. The formation of the dyestuff is completed after about 3-4 hours. The whole is then allowed to cool and the dyestuff is separated by filtration, freed from adherent bisulphite in the manner described in Example 1, dissolved in a solution of sodium carbonate and salted out from the solution.

The thus obtained dyestuff of the probable formula,

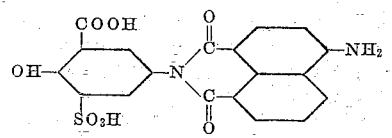

when used with chromium mordant in color discharge printing, yields resistant shades of good fastness properties.

*Example 4*

A mixture of

| | Parts |
|---|---|
| 4-nitro-naphthalene-1,8-dicarboxylic acid | 261 |
| 5-amino-2 hydroxybenzoic acid | 153 |
| Solution of sodium bisulphite of 40° Bé | 2000 |
| Water | 500 | is heated to boiling whilst stirring. After a short time there is formed a yellow solution and after about 2 hours 5-amino-2-hydroxybenzoic acid can no longer be detected in the reaction mixture.

The solution is cooled and acidified, whereupon the yellow dyestuff which is formed is precipitated in the form of the free dyestuff acid. It is filtered, dissolved in alkali and salted out from the solution.

The dyestuff thus obtained, corresponding probably to the formula:

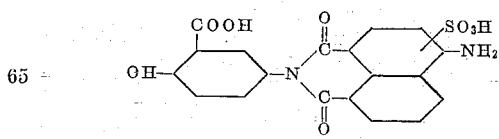

resembles that described in Example 1.

What we claim is:—

1. A process for the manufacture of yellow mordant dyestuffs, consisting in heating a 4- or 3-amino-naphthalene-1,8-dicarboxylic acid compound and an amino-hydroxybenzoic acid compound bearing the amino group in meta-position to the carboxylic group together in aqueous suspension.

2. A process for the manufacture of yellow mordant dyestuffs, consisting in heating a 4- or 3-amino-naphthalene-1,8-dicarboxylic acid compound and an amino-hydroxybenzoic acid compound bearing the amino group in meta-position to the carboxylic group, at least one of said bodies bearing a sulpho group, together in aqueous suspension.

3. A process for the manufacture of yellow mordant dyestuffs, consisting in heating a sulphonated 4-amino-naphthalene-1,8-dicarboxylic acid compound and an amino-hydroxybenzoic acid compound bearing the amino group in meta-position to the carboxylic group together in aqueous suspension.

4. A process for the manufacture of yellow mordant dyestuffs, consisting in heating a sulphonated 4- or 3-amino-naphthalene-1,8-dicarboxylic acid compound and 5-amino-2-hydroxybenzoic acid together in aqueous suspension.

5. A process for the manufacture of yellow mordant dyestuffs, consisting in heating a 4- or 3-amino-naphthalene-1,8-dicarboxylic acid compound and an amino-hydroxybenzoic acid compound bearing the amino group in meta-position to the carboxylic group together in aqueous suspension in the presence of an alkali bisulphite as condensing agent.

6. A process for the manufacture of yellow mordant dyestuffs, consisting in heating a sulphonated 4-amino-naphthalene-1,8-dicarboxylic acid compound and 5-amino-2-hydroxybenzoic acid together in aqueous suspension.

7. A process for the manufacture of yellow mordant dyestuffs, consisting in heating a sulphonated 4-aminonaphthalene-1,8-dicarboxylic acid and 5-amino-2-hydroxybenzoic acid together in aqueous suspension in the presence of sodium bisulphite.

8. A process for the manufacture of yellow mordant dyestuffs, consisting in heating a sulphonated 4- or 3-aminonaphthalene-1,8-dicarboxylic acid, this body being directly prepared in the reaction mass by treating a 4- or 3-nitro-naphthalene-1,8-dicarboxylic acid with a bisulphite to reduce the nitro group to the amino group and to produce the entry of a sulpho group in the molecule; and an amino-hydroxybenzoic acid compound bearing the amino group in meta-position to the carboxylic group together in aqueous suspension in the presence of a bisulphite.

9. A process for the manufacture of yellow mordant dyestuffs, consisting in heating a sulphonated 4-amino-naphthalene-1,8-dicarboxylic acid, this body being directly prepared in the reaction mass by treating 4-nitro-naphthalene-1,8-dicarboxylic acid with a bisulphite to reduce the nitro group to the amino group and to produce the entry of a sulpho group in the molecule, and 5-amino-2-hydroxybenzoic acid together in aqueous suspension in the presence of a bisulphite.

10. The herein described yellow mordant dyestuffs as condensation products from a 4- or 3-amino-naphthalene-1,8-dicarboxylic acid compound and an amino-hydroxybenzoic acid compound bearing the amino group in meta-position to the carboxylic group, said mordant dyestuffs constituting yellow powders in the form of alkali salts, easily soluble in water to yellow solutions, having a green fluorescence, giving with concentrated sulphuric acid faintly yellow solutions, which become more intensely yellow on dilution with water, said dyestuffs dyeing the fibre with chrome mordant fast yellow shades and in view of their good resistance to reducing agents, being usable in reduction colour discharge printing.

11. The herein described yellow mordant dyestuffs as condensation products from a 4- or 3-amino-naphthalene-1,8-dicarboxylic acid compound and an amino-hydroxybenzoic acid compound bearing the amino group in meta-position to the carboxylic group, at least one of said bodies being sulphonated, said mordant dyestuffs constituting yellow powders in the form of alkali salts, easily soluble in water to yellow solutions, having a green fluorescence, giving with concentrated sulphuric acid faintly yellow solutions which become more intensely yellow on dilution with water, said dyestuffs dyeing the fibre with chrome mordant fast yellow shades and in view of their good resistance to reducing agents, being usable in reduction colour discharge printing.

ERNST BODMER.
FRANZ NEITZEL.